United States Patent

Kuenen

Patent Number: 5,951,760
Date of Patent: Sep. 14, 1999

[54] DEVICE FOR COATING WITH BREADCRUMBS

[75] Inventor: Hendrikus Antonius Jacobus Kuenen, Overloon, Netherlands

[73] Assignee: Koppens B.V., Bakel, Netherlands

[21] Appl. No.: 09/150,297

[22] Filed: Sep. 9, 1998

[30] Foreign Application Priority Data

Sep. 12, 1997 [NL] Netherlands .......................... 1007032

[51] Int. Cl.⁶ .................................................. A23G 3/00
[52] U.S. Cl. .............................. 118/13; 118/23; 118/24; 118/308; 118/312
[58] Field of Search ................................. 118/13, 23, 24, 118/308, 312; 426/209

[56] References Cited

U.S. PATENT DOCUMENTS

| | | |
|---|---|---|
| 2,855,893 | 10/1958 | Greet et al. . |
| 3,759,218 | 9/1973 | Korstvedt . |
| 4,333,415 | 6/1982 | Miller et al. . |
| 5,647,905 | 7/1997 | Bertrand et al. . |

FOREIGN PATENT DOCUMENTS

| | | |
|---|---|---|
| 113 927 | 7/1984 | European Pat. Off. . |
| 397 | 11/1990 | European Pat. Off. . |
| 7810080 | 4/1980 | Netherlands . |

*Primary Examiner*—Laura Edwards
*Attorney, Agent, or Firm*—Sughrue, Mion, Zinn, Macpeak & Seas, PLLC

[57] ABSTRACT

A device for coating food products with granular material, for example breadcrumb material, comprises a rotating conveyor belt which is permeable to the granular material and on which the food products can be held, guide plates which extend beneath at least a section of the top part and the bottom part of the conveyor belt, a feed, which opens out above the top part of the conveyor belt, for the granular material, a diverter for guiding the granular material from the top part to the bottom part of the a conveyor belt and back, as well as conveyor for conveying granular material from the top part of the conveyor belt to the feed. A selection device to which granular material is fed from the top part of the conveyor belt is situated between the top part and the bottom part of the conveyor belt, via which selection device selected granular material is fed to the bottom part of the conveyor belt.

10 Claims, 3 Drawing Sheets

DEVICE FOR COATING WITH BREADCRUMBS

BACKGROUND OF THE PRESENT INVENTION

The invention relates to a device for coating food products with granular material, for example breadcrumb material, comprising a rotating conveyor belt which is permeable to the granular material and on which the food products can be held, guide plates which extend beneath a section of the top part and the bottom part of the conveyor belt, a feed, which opens out above the top part of the conveyor belt, for the granular material, diverter means for guiding the granular material from the top part to the bottom part of the conveyor belt and back, as well as conveyor means for conveying granular material from the top part of the conveyor belt to the feed.

An invention of this nature is known from EP-B-397,267 and U.S. Pat. No. 3,759,218. In the first known device, the bottom part is guided along an S-shaped path in which there is incorporated a buffer with an overflow, via which some of the granular material is conveyed upwards and back to a storage hopper which opens out above the top part of the conveyor belt.

The granular material comprises a mixture of relatively fine and relatively coarse constituents. The relatively fine constituents sink downwards more quickly than the relatively coarse constituents, with the result that during the conveyance of the said material segregation can occur, so that separate layers containing relatively fine and relatively coarse material are formed.

As a result, it is not always readily possible to coat the products in the correct way. For example, it may be desirable to coat the products with relatively coarse material on the top side or the visible side. However, if the relatively fine constituents reach the products first, the adhesion of the relatively coarse constituents is then impaired. The known device has the drawback that the coating process cannot be controlled in the desired way.

SUMMARY OF THE INVENTION

The object of the invention is therefore to provide a device of the type mentioned above in which the distribution of relatively fine and relatively coarse constituents of the coating material can be controlled better. This object is achieved by the fact that a selection means for dividing the granular material into a relatively fine fraction and a relatively coarse fraction is situated between the top part and the bottom part of the conveyor belt, to which selection means the granular material is fed from the top part of the conveyor belt, via which selection means the relatively fine fraction of the granular material is fed to the bottom part of the conveyor belt and the relatively coarse fraction of the granular material is fed to the conveyor means.

The granular material originating from the top part of the conveyor belt is selected in such a manner that, for example, the relatively fine constituents pass onto the bottom part of the conveyor belt and the relatively coarse parts pass into the conveyor means (screens). Via the diverter means, the relatively fine constituents are moved onto the top part of the conveyor belt. The consequence is that the products come to lie on a layer of screened, relatively fine material. The relatively coarse constituents which have been conveyed upwards by the conveyor means are used for coating the products on the top side.

Another advantage is that not all the material, but rather only the relatively coarse material, is conveyed to the top part of the conveyor belt by the conveyor means. The total volume of material to be conveyed consequently remains limited, so that the capacity of the conveyor means can remain relatively low and the material itself does not crumble to such an extent.

Reference is made to the device which is known from U.S. Pat. No. 4,333,415. This known device also has a conveyor means which, however, conveys the total volume of material to the top part. The material is only screened above the said top part.

The selection means according to the invention may comprise a screen plate which is provided with screen openings, which screen plate is connected to the guide plate which extends beneath the top part of the conveyor belt. This screen plate extends downwards at an angle from the guide plate which extends beneath the top part of the conveyor belt.

The division between relatively fine and relatively coarse parts which is obtained during screening by means of the screen plate depends on the nature, size and orientation of the screen openings. A different division will generally also be desirable for different products. In the device according to the invention, this division can be adapted in a simple manner if the screen plate is of exchangeable design. Therefore, a set of exchangeable plates, each with their own pattern of openings, belongs to the device, in order to effect a specific desired division.

The screen plate may, for example, have slots which run transversely to the direction of transport of the conveyor belt for allowing through fine granular material. The relatively fine material falls through the transversely positioned slots, while the relatively coarse material slides over the slots. A screen plate of this nature is then also eminently suitable for separating relatively coarse and relatively fine constituents to a substantial extent.

According to a further option, the selection plate may have longitudinal slots for essentially allowing the granular material to pass through in the unscreened state. A selection plate of this nature is suitable for controlling the distribution of the total quantity of material over the top side and bottom side of the products to be coated.

It is also possible to design a selection plate with both sorts of openings, in such a manner that a moderate level of division is obtained.

The results relating to coating the food products by means of the device according to the invention can be improved still further if the selection means is connected to a buffer for collecting the selected material, which buffer has a discharge which opens out above the bottom part of the conveyor belt. The discharge of the buffer may be of adjustable size.

Depending on the type of screen plate, the relatively fine material may be collected in the buffer. Depending on the size of discharge opening which is set, a more or less thick layer of coating material is obtained as the bottom layer on which the food products to be coated are to be placed.

BRIEF DESCRIPTION OF THE DRAWINGS

The invention will be explained in more detail below with reference to a number of exemplary embodiments which are illustrated in the figures, in which.

DETAILED DESCRIPTION OF THE PREFERRED EMBODIMENTS

Figure 1:
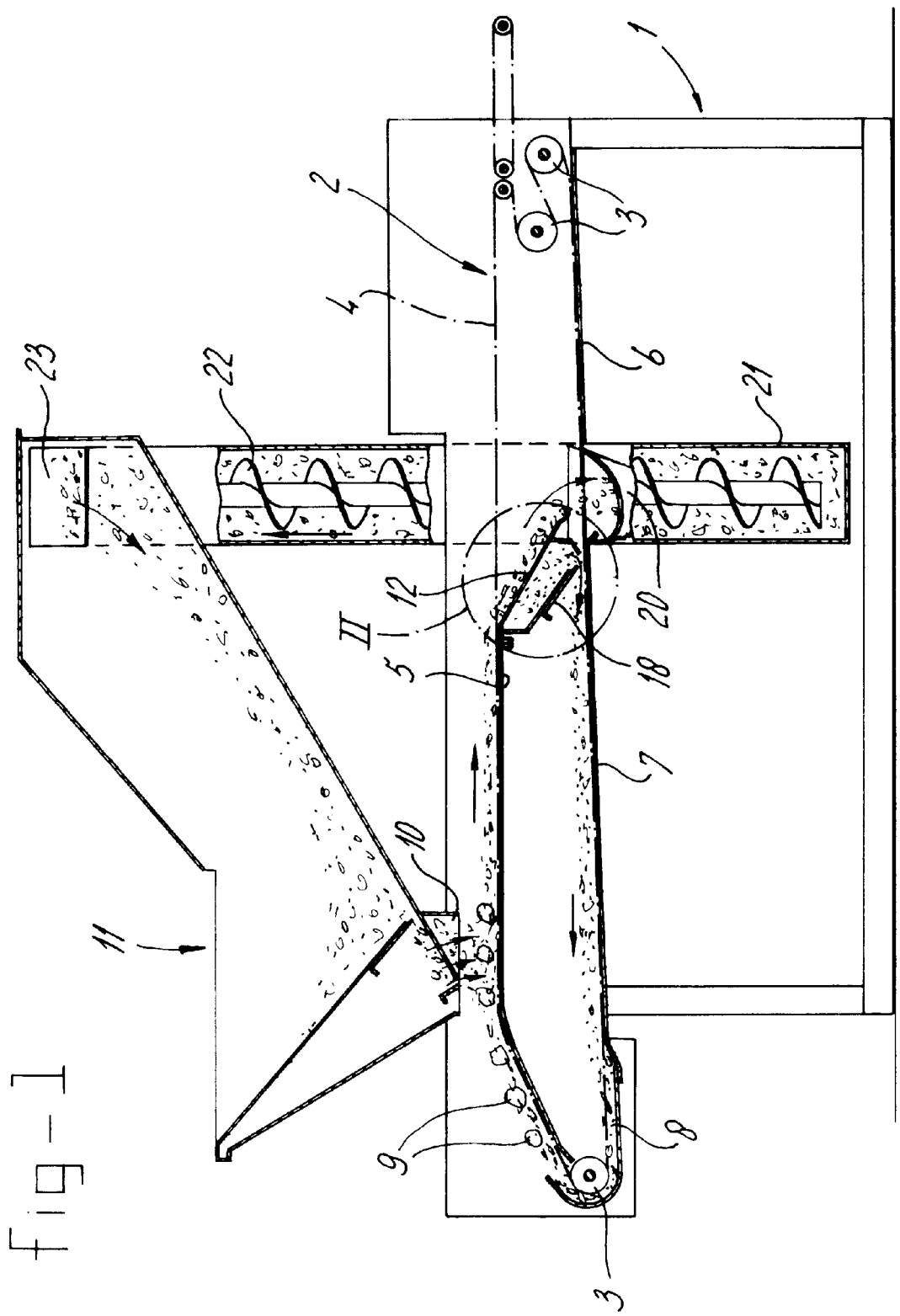
FIG. 1 shows a side view, in cross-section, of the device according to the invention.

The device which is illustrated in FIG. 1 for coating food products with a granular material, such as breadcrumbs, comprises a frame 1, in which the open conveyor belt, which is indicated by dot-dashed lines and is made from wire material, is guided around rollers 3. The conveyor belt 2 has a top part 4, beneath which a top guide plate 5 extends; furthermore, the conveyor belt 2 has a bottom part 6, beneath which a bottom guide plate 7 extends.

The direction of rotation of the conveyor belt 2 is to the right in FIG. 1, as indicated by arrows. At the left-hand end, in FIG. 1, of the conveyor belt 2, the bottom guide plate 7 merges into a diverter plate 8 which lies at a lower level than the bottom guide plate 7 and runs in a curve around the corresponding roller 3. The granular material which is supported on the bottom guide plate 7 is carried along by the conveyor belt 2 which is inherently permeable to the material, and via the diverter plate 8 is fed to the right over the top guide plate 5. On the left-hand section of the top guide plate 5, the food products 9 are moved onto the layer of coating material which has already been formed. The food products 9 emanate from a further conveyor belt which is not shown.

The products 9 then pass beneath the outlet 10 of the storage hopper, which is denoted overall by 11, where a further quantity of granular material is positioned on the top side of the food products 9.

Figure 2:
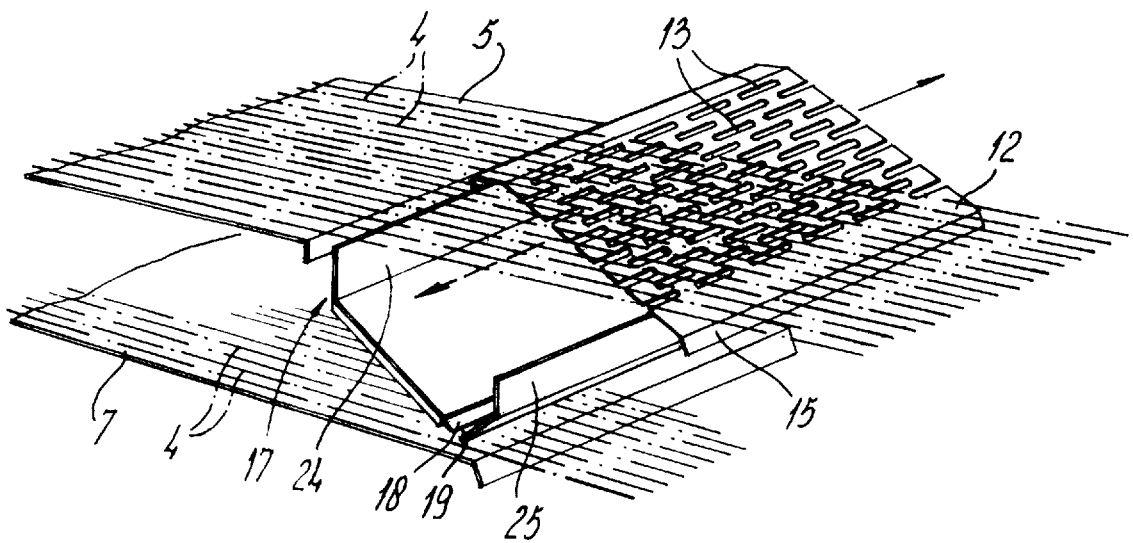
FIG. 2 shows a detail in accordance with II of FIG. 1, in perspective view.
Figure 3:
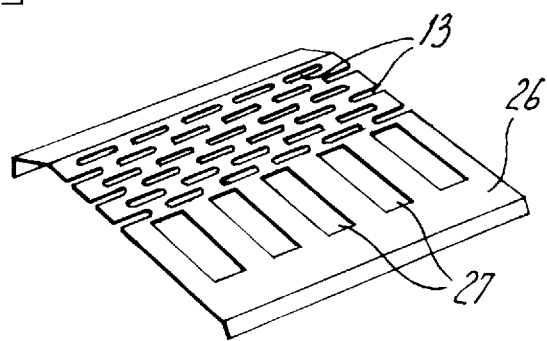
FIG. 3 shows a first alternative screen plate.
Figure 5:
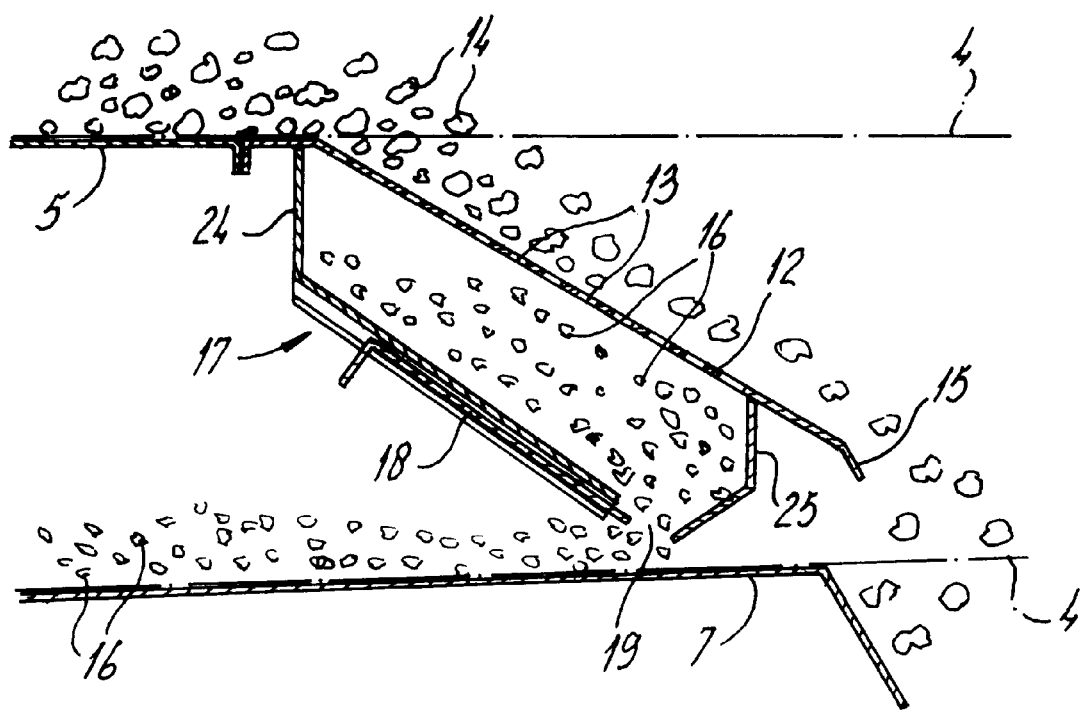
FIG. 5 shows detail II on a larger scale, as well as the screening effect.

As the top part 4 of the conveyor belt 2 moves further to the right, the products 9, which are now fully coated, are removed and the granular material falls through the conveyor belt 2 onto the screen plate, which is denoted overall by 12. As illustrated in FIGS. 2, 3 and 5, this screen plate has a large number of slots 13 running in the transverse direction. The relatively coarse constituents 14 of the granular material are not able to fall down through these slots 13, with the result that they are removed via the bottom end or overflow 15.

The relatively fine parts 16 of the material can pass through the openings 13, after which they pass into the buffer, which is denoted overall by 17. In this buffer 17, which is covered at the top by the screen plate 12, a quantity of relatively fine parts 16 collects as a function of the position of slide 18 which covers the discharge opening 19 of the buffer 17 to a greater or lesser extent. Depending on the size of this opening, a layer of granular material comprising relatively fine parts 16 is formed on the bottom part 6 of the conveyor belt, as supported by the bottom guide plate 7.

As illustrated in FIG. 1, the relatively coarse material passes, via the overflow 15 and a lateral guide 20, into a sleeve 21 in which there is a screw conveyor 22. By means of this screw conveyor 22, the material is pumped upwards to an opening 23 in the top section of the storage hopper 11, in such a manner that the said material can then be applied once again to the top side of the products 9.

Since the material is already screened before it passes into sleeve 21, only the material which has been removed via the screen plate 12 and its overflow 15 has to be pumped upwards. The total quantity of material to be pumped round consequently remains limited, with the result that the conveyor device 20, 21 can be of less substantial design and also the crumbling effect remains limited.

As shown in FIG. 2, the screen plate 12 can be pushed backwards and forwards across the buffer 17. Therefore, the screen plate 12 can easily be pushed laterally away in a simple manner over the upright walls 24, 25 of the buffer 17.

The screen plate 26 shown in FIG. 3 can also be used instead of the screen plate 12 shown in FIG. 2. In addition to slots 13 running in the transverse direction, this screen plate 26 also has slots 27 running in the longitudinal direction. The slots 27 are sufficiently wide for all the material, even the relatively coarse parts, to fall down through them. There is no screening action in this case, but rather the material is divided into a fraction which is fed to the bottom part 6 of the conveyor belt 2 and a fraction which is fed to the conveyor device 20, 21 and then, via the hopper 11, to the top part 4.

However, the slots 13 which run in the transverse direction still ensure some level of screening activity, so that the fraction of relatively fine material which passes onto the bottom part 6 of the conveyor belt 2 is still greater than average, but less than in the case of the screen plate shown in FIG. 2.

Figure 4:
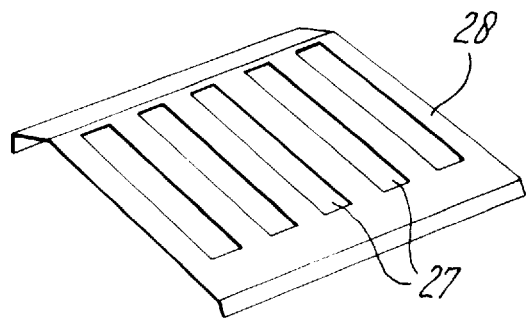
FIG. 4 shows a second alternative screen plate.

In the case of the plates 28 shown in FIG. 4, only the slots 27 which run in the longitudinal direction are used, so that in that case there is no screening activity whatsoever.

Plate 28 is used if the material has to be split into two streams, one for the bottom part 6 and one for the top part 4 of the belt, as explained above with reference to FIG. 3.

I claim:

1. A device for coating food products with granular material, comprising:

a rotating conveyor belt which is permeable to the granular material and on which the food products are held;

guide plates which extend beneath at least a section of a top part and a bottom part of the conveyor belt;

a feed, which opens out above the top part of the conveyor belt, for the feeding of said granular material for coating said food products on said conveyor belt;

diverter means for guiding the granular material from the top part to the bottom part of the conveyor belt and back;

conveyor means for conveying granular material from the top part of the conveyor belt to the feed; and selection means for dividing the granular material into a relatively fine fraction and a relatively coarse fraction situated between the top part and the bottom part of the conveyor belt, said selection means comprising a screen plate which is provided with screen openings wherein the screen plate is connected to the guide plate which extends beneath the top part of the conveyor belt, wherein with said selection means the granular material is fed from the top part of the conveyor belt, and via which selection means the relatively fine fraction of the granular material is fed to the bottom part of the conveyor belt and the relatively coarse fraction of the granular material is fed back to the conveyor means for recirculating of excess granular material.

2. Device according to claim 1, in which the selection means has an overflow (15) for removing the relatively coarse fraction of material from the granular material to the conveyor means.

3. Device according to claim 1, in which the screen plate extends downwards at an angle from the guide plate which extends beneath the top part of the conveyor belt.

4. Device according to claim 1, in which the screen plate is exchangeable.

5. Device according to claim 1, in which the screen plate has slots which run transversely to the direction of transport of the conveyor belt for allowing through fine granular material.

6. Device according to claim 1, in which the selection means has a divider plate with longitudinal slots for dividing the granular material in the unscreened state.

7. Device according to claim 1, in which the selection means is connected to a buffer for collecting the selected material.

8. Device according to claim 7, in which the buffer has a discharge which opens out above the bottom part of the conveyor belt.

9. Device according to claim 8, in which the discharge has an opening of adjustable size.

10. The device according to claim 7, wherein the buffer is positioned between the top part and the bottom part of the conveyor belt.

* * * * *